(12) United States Patent
Kagawa

(10) Patent No.: US 8,786,430 B2
(45) Date of Patent: Jul. 22, 2014

(54) WIRELESS COMMUNICATION SYSTEM AND METHOD FOR COMMUNICATING DISASTER INFORMATION

(75) Inventor: Noriaki Kagawa, Yokohama (JP)

(73) Assignee: Kyocera Corporation, Kyoto (JP)

( * ) Notice: Subject to any disclaimer, the term of this patent is extended or adjusted under 35 U.S.C. 154(b) by 572 days.

(21) Appl. No.: 12/413,441

(22) Filed: Mar. 27, 2009

(65) Prior Publication Data

US 2009/0243845 A1    Oct. 1, 2009

(30) Foreign Application Priority Data

Mar. 28, 2008    (JP) ................................. 2008-086387

(51) Int. Cl.
*G08B 1/08*    (2006.01)

(52) U.S. Cl.
USPC ................. 340/539.26; 340/506; 340/286.02; 340/539.17

(58) Field of Classification Search
USPC .......... 340/540, 539.26, 286.02, 539.17, 506; 455/404, 567; 725/33, 35; 379/37, 45; 709/200

See application file for complete search history.

(56) References Cited

U.S. PATENT DOCUMENTS

| | | | |
|---|---|---|---|
| 6,114,967 A * | 9/2000 | Yousif ............................ | 340/690 |
| 6,169,476 B1 * | 1/2001 | Flanagan ................. | 340/286.02 |
| 6,518,878 B1 * | 2/2003 | Skoff ............................. | 340/506 |
| 6,574,561 B2 * | 6/2003 | Alexander et al. ................ | 702/5 |
| 6,608,559 B1 * | 8/2003 | Lemelson et al. ........ | 340/539.13 |
| 6,816,878 B1 * | 11/2004 | Zimmers et al. ............... | 709/200 |
| 6,999,876 B2 * | 2/2006 | Lambert et al. .................... | 702/2 |
| 7,233,781 B2 * | 6/2007 | Hunter et al. .............. | 455/404.1 |
| 7,233,795 B1 * | 6/2007 | Ryden ........................... | 455/445 |
| 7,280,038 B2 * | 10/2007 | Robinson ...................... | 340/506 |
| 7,346,432 B2 * | 3/2008 | Matsumiya et al. .......... | 700/275 |
| 7,409,428 B1 * | 8/2008 | Brabec et al. .................. | 709/206 |
| 7,515,041 B2 * | 4/2009 | Eisold et al. .................. | 340/506 |
| 7,525,421 B2 * | 4/2009 | Levesque et al. ............. | 340/517 |
| 7,602,277 B1 * | 10/2009 | Daly et al. ..................... | 340/438 |
| 7,664,233 B1 * | 2/2010 | Kirchmeier et al. ............ | 379/37 |
| 7,683,792 B2 * | 3/2010 | Araiza-Boys ................. | 340/601 |
| 7,755,481 B2 * | 7/2010 | Gayden ..................... | 340/539.26 |
| 7,817,982 B1 * | 10/2010 | Chu et al. ................... | 455/404.1 |
| 7,895,263 B1 * | 2/2011 | Kirchmeier et al. .......... | 709/203 |
| 7,924,149 B2 * | 4/2011 | Mendelson ............... | 340/539.11 |
| 2003/0069002 A1 * | 4/2003 | Hunter et al. .................. | 455/404 |
| 2003/0078029 A1 * | 4/2003 | Petite ............................ | 455/404 |
| 2003/0141971 A1 * | 7/2003 | Heiken, Jr. .................... | 340/506 |
| 2003/0146823 A1 * | 8/2003 | Jansson .................... | 340/286.02 |
| 2004/0015336 A1 * | 1/2004 | Kulesz et al. ..................... | 703/11 |
| 2005/0013417 A1 * | 1/2005 | Zimmers et al. ................. | 379/37 |
| 2005/0031096 A1 * | 2/2005 | Postrel ....................... | 379/88.22 |
| 2005/0273330 A1 * | 12/2005 | Johnson ........................ | 704/246 |
| 2006/0273884 A1 * | 12/2006 | Watkins et al. ............. | 340/425.5 |
| 2007/0040895 A1 * | 2/2007 | Barbeau et al. ............. | 348/14.01 |
| 2007/0041514 A1 * | 2/2007 | Rodkey et al. .................. | 379/37 |
| 2007/0072583 A1 * | 3/2007 | Barbeau et al. ............ | 455/404.2 |
| 2007/0204291 A1 * | 8/2007 | Ichihashi ........................ | 725/33 |

(Continued)

FOREIGN PATENT DOCUMENTS

JP    2007156766    6/2007

*Primary Examiner* — Hoi Lau
(74) *Attorney, Agent, or Firm* — Duane Morris LLP

(57) ABSTRACT

A wireless communication apparatus and technology operable to display disaster information is disclosed. The system receives information on a disaster such as earthquakes, tsunamis, typhoons, rain, or snow, and content can be displayed based on the type and severity of the disaster.

17 Claims, 7 Drawing Sheets

(56) References Cited

U.S. PATENT DOCUMENTS

| | | | |
|---|---|---|---|
| 2007/0210910 A1* | 9/2007 | Norstrom et al. | 340/506 |
| 2007/0216535 A1* | 9/2007 | Carrino | 340/573.1 |
| 2007/0252688 A1* | 11/2007 | Eisold et al. | 340/506 |
| 2007/0296575 A1* | 12/2007 | Eisold et al. | 340/539.16 |
| 2008/0025721 A1* | 1/2008 | Wynman | 398/38 |
| 2011/0241877 A1* | 10/2011 | Wedig et al. | 340/540 |

* cited by examiner

WIRELESS COMMUNICATION SYSTEM AND METHOD FOR COMMUNICATING DISASTER INFORMATION

CROSS-REFERENCE TO RELATED APPLICATION

The present application claims priority under 35 U.S.C. §119 to Japanese Patent Application No. 2008-086387, filed on Mar. 28, 2008. The content of which is incorporated by reference herein in its entirety.

FIELD OF INVENTION

Embodiments of the present disclosure relate generally to a wireless communication apparatus, and more particularly relate to a method of controlling the wireless communication apparatus.

BACKGROUND OF THE INVENTION

In recent years, systems for receiving disaster information such as an emergency earthquake flash report or the like have been introduced. The disaster information may be mainly distributed by meteorological agencies. Such systems are useful for preventing or reducing potential damage that may be caused by a disaster.

Various systems have been discussed as a medium for notifying users about disaster information. These systems may include a wireless communication system such as, for example, a portable telephone. If the wireless communication system receives the disaster information from a base station, such systems may inform a user by causing an alarm to sound, or displaying a message on a liquid crystal display device.

It is important for a user of such a system to know the level of severity of a disaster in order to make a proper decision for damage control and self protection. Therefore, there is a need for notifying the user about the intensity or degree of severity of the disaster.

SUMMARY

A wireless communication apparatus and technology operable to display disaster information is disclosed. The system receives information on a disaster such as earthquakes, tsunamis, typhoons, rain, or snow, and control content can be displayed based on the type and severity of the disaster.

A first embodiment comprises a wireless communication apparatus. The wireless communication apparatus comprises a receiver configured to receive disaster information, and a detector configured to detect a degree of a disaster from the disaster information. The wireless communication apparatus further comprises a controller configured to set a control content corresponding to the degree of the disaster.

A second embodiment comprises a method of controlling a wireless communication apparatus. The method comprises receiving disaster information, detecting a degree of a disaster based on the disaster information; and setting a control content corresponding to the degree of the disaster.

A third embodiment comprises a computer-readable medium for a wireless communication system. The computer-readable medium comprises program code for receiving disaster information, detecting a degree of a disaster based on the disaster information, and setting a control content corresponding to the degree of the disaster.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the disclosure. The figures are provided to facilitate understanding of the disclosure without limiting the breadth, scope, scale, or applicability of the disclosure. The drawings are not necessarily made to scale.

DETAILED DESCRIPTION OF EXEMPLARY EMBODIMENTS

Figure 1:
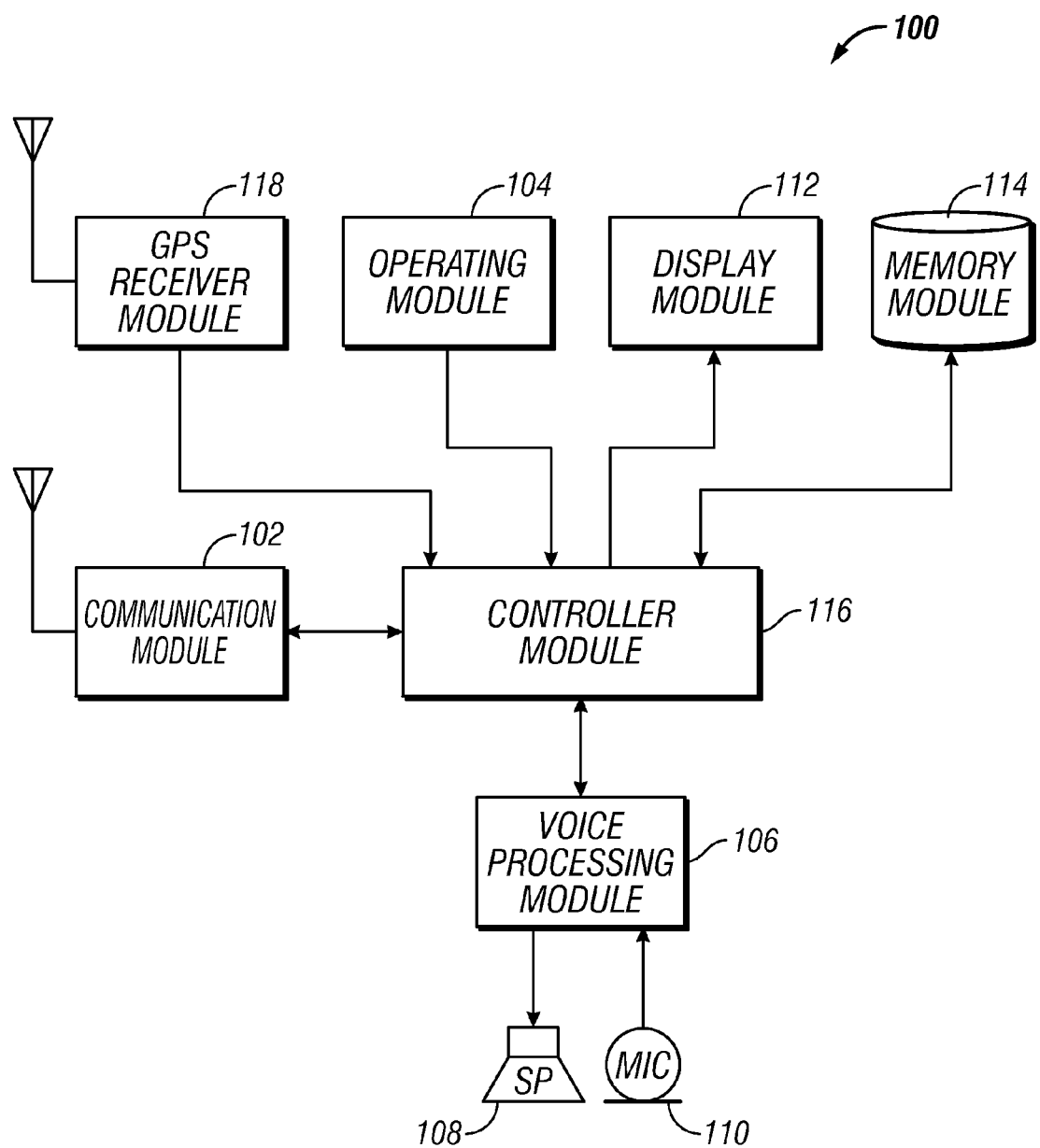
FIG. 1 illustrates an exemplary schematic block diagram showing a wireless communication system according to an embodiment of the disclosure.

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the invention. Furthermore, there is no intention to be bound by any expressed or implied theory presented in the preceding technical field, background, brief summary or the following detailed description. The present disclosure should be accorded scope consistent with the claims, and not limited to the examples described and shown herein.

Embodiments of the disclosure are described herein in the context of practical non-limiting applications, namely, detecting intensity of an earthquake via an earthquake flash report (i.e., a disaster information corresponding to the earthquake occurrence time). In the disclosure, a value of 6 on the Richter scale is used, without limitation, for an example of an earthquake intensity, whereas in other embodiments or realizations of the disclosure, other values and other measurement systems and scales may be used. Embodiments of the disclosure, however, are not limited to handling earthquakes, and the techniques described herein may also be utilized for detecting intensity of other disasters. For example, embodiments may be applicable to hurricane, Tsunami, volcano, typhoon, rain, snow and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

The following description is presented to enable a person of ordinary skill in the art to make and use the embodiments of the disclosure. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, embodiments of the present disclosure are not intended to be limited to the examples described herein and shown, but are to be accorded the scope consistent with the claims.

In the following description of exemplary embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the present invention.

FIG. 1 illustrates an exemplary schematic block diagram showing a wireless communication system 100 (i.e., a portable phone 100 or mobile station 100) according to an embodiment of the disclosure. A practical embodiment of the system 100 comprises additional components and elements configured to support known or conventional operating features that need not be described in detail herein. In the example embodiment, system 100 can be used to transmit and receive data in a wireless communication environment for detecting and indicating intensity of a disaster. System 100 generally comprises a communication module 102, an operating module 104, a voice processing module 106, a speaker (SP) module 108, a microphone (MIC) module 110, a display module 112, a memory module 114, a controller module 116, and a GPS receiver module 118.

System 100 (wireless communication system 100) may comprise any number of communication modules, any number of GPS receiver modules, any number of operating modules, any number of controller modules, any number of memory modules, etc. The illustrated system 100 depicts a simple embodiment for ease of description. These and other elements of system 100 may be interconnected together using a data communication bus (not shown in FIG. 1), or any suitable interconnection arrangement. Such interconnection facilitates communication between the various elements of system 100. Those skilled in the art will understand that the various illustrative blocks, modules, circuits, and processing logic described in connection with the embodiments disclosed herein may be implemented in hardware, computer-readable software, firmware, software on computer-readable media, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present disclosure.

The communication module 102 is operable to transmit and receive a plurality of communication signals via a communication module transceiver (not shown). The communication module 102 is also operable to carry out a radio communication with a network side device via a mobile communication network (not shown). The network side device may include an emergency call center, including a base station communicatively coupled to the mobile communication network. The communication module transceiver communicates with a base station transceiver via a wireless data communication link (not shown). The communication module transceiver cooperates with the base station transceiver with a suitably configured RF antenna arrangement 122 that can support a particular wireless communication protocol and modulation scheme.

The communication module 102 is configured to receive disaster information, and supply the received disaster information to the controller module 116. The disaster information may be, for example, an emergency earthquake flash report as described in more detail below in connection to various embodiments of the disclosure. The communication module 102 is also configured to transmit positional information (for example, global positioning system (GPS) information) acquired by the controller module 116. The controller module 116 may compress the positional information and send it to a predetermined external apparatus (not shown). Further, the communication module 102 transmits the positional information at a predetermined repetition frequency (for example, five times) under the control of the controller module 116, until the positional information is successfully transmitted. Upon successful transmission of the positional information, the communication module 102 repeats the transmission of the positional information at a predetermined repetition frequency at a fixed interval (for example, ten minutes) under the control of the controller module 116 until the positional information is successfully transmitted.

During an earthquake, a small shaking (a primary wave) called a P-wave in a preliminary tremor, and a great shaking (a secondary wave) called an S-wave in a principal motion are simultaneously generated. The P-wave and the S-wave have different propagation speeds, the P-wave is propagated at about 7 km per second, and the S-wave is propagated at about 4 km per second. The system of the emergency earthquake flash report utilizes the propagation speeds of the P-wave and the S-wave, and makes a quick report after detecting the small shaking (the P-wave). A purpose of the quick report is to give warning to allow a person (user) to self protect before the great shaking (the S-wave) reaches the person (user). For example, content of the emergency earthquake flash report for informing the user, may include an earthquake intensity (herein corresponding to a degree of the disaster) and an estimated time of arrival for the great shaking (the S-wave).

The operating module 104 may comprise an input pad with keys for performing various functions which can be activated by the user. For example keys may comprise a power supply key, a phone call key, a numeric key, a letter key, a direction key, a decision key, a call originating key and the like. In response to activation of at least one of the keys (activated key), a signal corresponding to a content of operation is transmitted to the controller module 116. The controller module 116 receives the signal and determines the corresponding instruction associated with the activated key. For example, the keys may be used to send an emergency message to a police department, Maritime Safety Agency, and/or a fire department (e.g., by dialing number 911).

The voice processing module 106 carries out a process for outputting a voice signal output from the speaker 108 and receiving a voice signal input in the microphone 110. The voice processing module 106 amplifies the voice input from the microphone 110, and carries out an analogue/digital conversion to obtain a digital voice input. The voice processing module 106 applies signal processing such as an encoding or the like to the digital voice input to obtain an encoded digital voice input, and sends the encoded digital voice input to the controller module 116.

The voice processing module 106 is also operable to apply signal processing to a digital voice data supplied from the controller module 116. The voice processing module 106 performs decoding, digital/analogue conversion, and amplification, of the digital voice data to convert it into an analogue voice signal for output to the speaker 108. The voice processing module 106 serves as an informing module for informing the user of emergency disaster information by means of an alarm sound, a voice message, or the like. According to an embodiment of the disclosure, the voice processing module 106 serves as an informing module if the disaster information is acquired by the controller module 116, and the degree of the disaster (e.g., the earthquake intensity) is detected and is sufficiently high.

The display module 112 is constructed by using a display device, for example, a liquid crystal display panel, an organic electro-luminescence (EL) panel or the like, and displays an area corresponding to an image signal supplied from the controller module 116. The display module 112 displays various information and images, for example, a telephone number of a received call at the time the is call received, a call waiting telephone number, contents of a received email, contents of an outgoing email, date, time, battery remaining amount, success and failure of calls, a standby screen, and the like. The display module 112 serves as a disaster map display displaying a disaster map. In this manner, if the controller module 116 determines that the positional information is acquired, the controller module 116 causes the display module 112 to display the disaster map. The disaster map comprises a map having information which may be of help at the time of the disaster. For example, a map may show areas with weak protection against earthquakes. The various information items, including the disaster map, can be previously stored in the memory module 114. Also, various modes can be employed such as downloading from a management center through the communication module 102 and the like. If the controller module 116 determines that the system 100 is within a building, the display module 112 may serve as an evacuation route display displaying an evacuation route within a building (which may be a predetermined building) under the control of the controller module 116. Alternatively, if the controller module 116 determines that the system 100 is not within a building (predetermined building) the display module 112 may serve as a disaster map display displaying the disaster map under the control of the controller module 116. If the disaster information is acquired by the controller module 116 and the earthquake intensity thereof is detected, the display module 112 may serve as an informing module to inform the user about the emergency disaster information by a text message or the like.

The memory module 114 stores various data utilized for the processing in the controller module 116. The memory module 114 stores, for example, an application program executed by the controller module 116, an address book managing a personal information such as a telephone number, an electronic mail address or the like of a communication partner, a voice file for reproducing a call incoming sound and an alarm sound, an image file for the standby screen, various setup data, a temporary data utilized in a process of the program and the like. The memory module 114, which may be realized as RAM memory, flash memory, ROM memory, EPROM memory, EEPROM memory, registers, a hard disk, a removable disk, a CD-ROM, or any other form of storage medium known in the art. In this regard, memory module 114 may be coupled to the controller module 116 module such that the controller module 116 can read information from and write information to memory module 114. As an example, the controller module 116 and memory module 114 may reside in their respective ASICs. The memory modules 114 may also be integrated into the controller module 116. In an embodiment, the memory module 114 may include a cache memory for storing temporary variables or other intermediate information during execution of instructions to be executed by the controller module 116. Memory module 114 may also include non-volatile memory for storing instructions to be executed by the controller module 116.

The controller module 116 is configured to suitably control operations of the portable telephone, and executes various controls in correspondence to the degree of the disaster. In other words, the controller module 116 controls operation of each of the blocks mentioned above in connection with FIGS. 1-2. For example, the controller module 116 may control sending and receiving of signals in the communication module 102, input and output of the voice in the voice processing module 106, display of the image in the display module 112 and the like. In this manner, the various processes of the system 100 (portable telephone) can be executed in accordance with a suitable procedure in correspondence to the operation of the operating module 104. The various processes of the portable telephone may comprise a voice phone call carried out via a line switching network, preparation of the electronic mail and send and receive thereof, access to an internet world wide web (Web) site and the like. The controller module 116 is provided with a computer (a microprocessor) executing the process on the basis of the program (an operating system, an application program or the like) stored in the memory module 114, and executes the process mentioned above in accordance with the procedure instructed in the program. In other words, it executes the process by sequentially reading a command cord from the program such as the operating system, the application program or the like stored in the memory module 114.

When a positional information request message is generated after an emergency call is sent, the controller module 116 measures positional information. The emergency call may be made to a specific number such as "number 911", or the like. The GPS receiver 118 receives information relating to latitude, longitude and time from a GPS satellite (not shown) so as to supply to the controller module 116. In this manner, the controller module 116 can measure and compute the current position of the wireless communication system 100.

The controller module 116 is operable to acquire positional information for the wireless communication system 100 when the degree of the disaster is equal to a predetermined level. The controller module 116 determines whether the wireless communication system 100 is in a predetermined building when the degree of the disaster meets a predetermined level. The controller module 116 also sets a control content corresponding to the degree of the disaster. Operation of the controller module 116 is discussed in more detail in the context of the discussion of FIG. 2.

Figure 2:
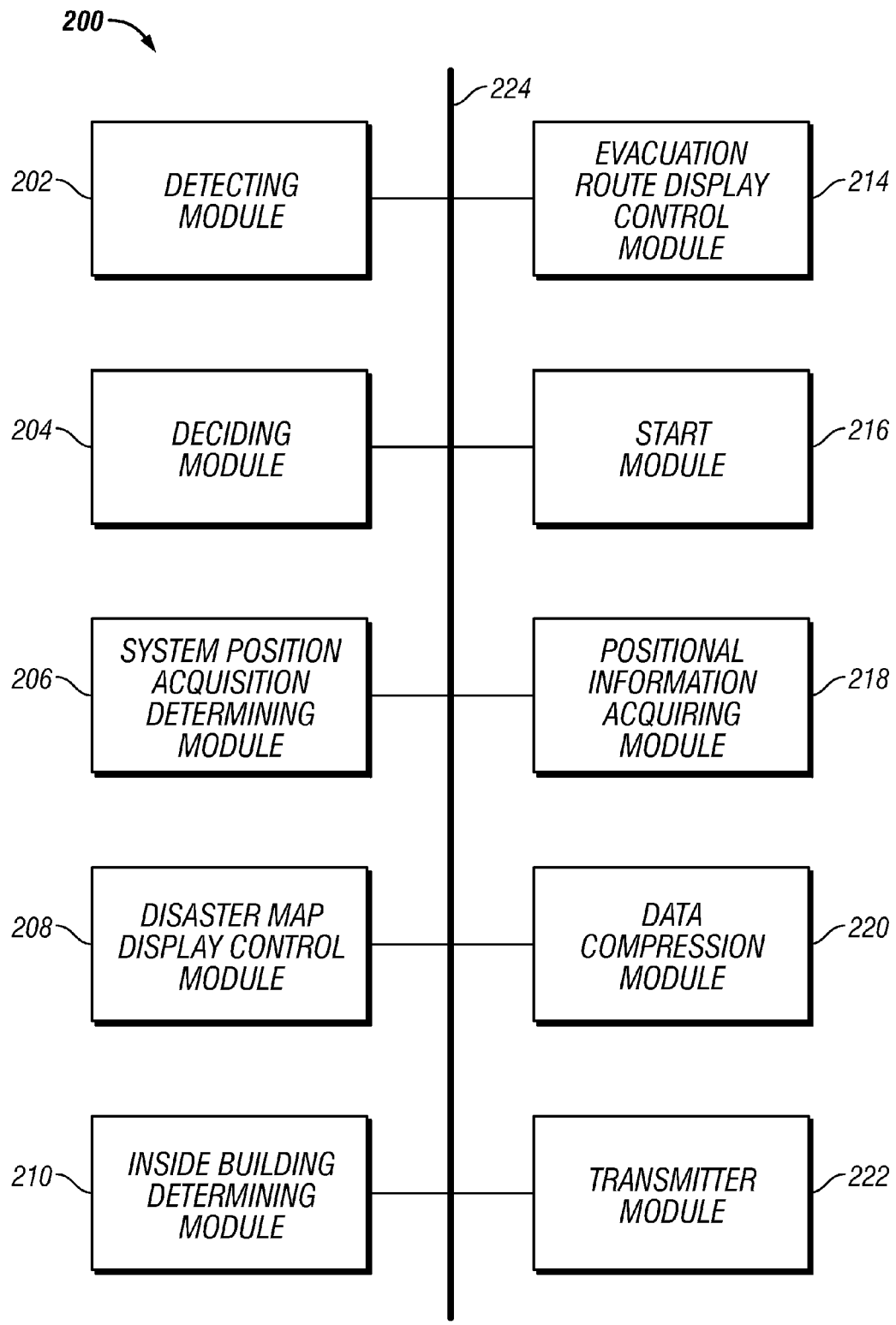
FIG. 2 illustrates an exemplary schematic block diagram of a controller module for executing a disaster information process according to an embodiment of the disclosure.

FIG. 2 illustrates an exemplary schematic block diagram of a system 200 (controller module) showing detail of the controller module 116 for executing a disaster information process according to an embodiment of the disclosure. The system 200 may comprise a detecting module 202, a deciding module 204, a system position acquisition determining module 206, a disaster map display control module 208, an inside building determining module 210, an evacuation route display control module 214, a start module 216, a positional information acquiring module 218, a data compression module 220, and a transmitter module 222.

The system 200 may comprise any number of the modules shown in FIG. 2. The illustrated system 200 depicts a simple embodiment for ease of description. These and other elements of system 200 may be interconnected together using a data communication bus 224, or any suitable interconnection arrangement. Such interconnection facilitates communication between the various elements of system 200. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

The detecting module 202 detects a degree of the disaster such as the earthquake intensity based on the emergency disaster information received by the communication module 102, and supplies the result to: the deciding module 204, the system position acquisition determining module 206, the inside building determining module 210, the start module 216, and the positional information acquiring module 218.

The deciding module 204 decides a priority for informing the user of the emergency earthquake information in correspondence to the degree of the disaster. For example, the deciding module 204 informs the user of the earthquake intensity detected by the detecting module 202. Since the informing priority is automatically decided by the system 100 as mentioned above, a work load of the user is reduced, since the user does not have to search for the information.

Further, the deciding module 204 decides on a mode of the system 100 in correspondence to the earthquake intensity detected by the detecting module 202, and controls the system 100 in such a manner as to activate the decided mode. The mode may be, for example, a power saving mode (state) such as a radio wave off mode, or a power supply off mode (state), and the like. In this manner, the deciding module 204 controls a power supply module (not shown) based on the decision, and changes to the power saving mode or the power supply off mode accordingly. In this manner, an electric power consumption of the system 100 can be reduced thereby achieving a long period of the operating time of the wireless communication system 100 at the time of the earthquake disaster or the like at which the power supply is hard to be secured. The mode may also save power by limiting the functionality of the system 100 (mobile phone) such as limiting voice phone calls.

The system position acquisition determining module 206 determines whether or not the positional information of the system 100 is acquired based on the earthquake intensity detected by the detecting module 202, and outputs the result to the disaster map display control module 208.

The disaster map display control module 208 may suitably control the display module 112 to display the disaster map. The display map is displayed on the display module 112 when the system position acquisition determining module 206 determines that the positional information of the system 100 is acquired. Further, the disaster map display controller module 208 may suitably control the display module 112 to display the evacuation route within the building. An evacuation route within the building is displayed on the display module 112 when the inside building determining module 210 determines that the system 100 is within the building. The disaster map display controller module 208 may also suitably control the display module 112 to display the disaster map, when it is determined by the inside building determining module 210 that the system 100 is not within the building.

The inside building determining module 210 determines whether or not the system 100 (and/or the user) is in a building in which the positional information can be registered. The inside building determining module 210 is further operable to determine whether the wireless communication system 100 is in a predetermined building when the degree of the disaster meets a predetermined level. The degree of the disaster may be based on the earthquake intensity detected by the detecting module 202. The positional information may be sent to the disaster map display control module 208 and the evacuation route display control module 214. In this case, the building in which the positional information can be registered means a building in which the information relating to the position of the building can be registered in the wireless communication system 100 or the management center. The inside building determining module 210 may be configured to determine whether or not the system 100 is in the building. Location information of the system 100 inside the building may be stored in an information node installed in the building. The information node of the building or the like, may be configured so as to determine if the user enters the building.

The evacuation route display control module 214 may suitably control the display module 112 to display the evacuation route within the building. The evacuation route display control module 214 may control the display module 112 to display an evacuation route within the building when it is determined that the system 100 is in the building in which the positional information can be registered. The evacuation route may be displayed, based on the degree of the disaster, for example, the earthquake intensity detected by the detecting module 202. The information relating to the evacuation route can be previously stored in the memory module 114. The information relating to the evacuation route may comprise an accuracy of the positional information specified by the building in which the positional information is registered. Various modes for acquiring the positional information can be used. For example the positional information can be downloaded from the management center through the communication module 102.

The start module 216 starts a television software application based on the earthquake intensity detected by the detecting module 202. Further, the start module 216 can be configured to provide a multi-channel television software application and to select one of the provided channels at the time of starting the television software application. In this manner, the start module 216 of the controller module 116 may select a predetermined channel when starting the television software application.

The positional information acquiring module 218 may acquire the positional information of the system 100 by receiving the information relating to the latitude, the longitude and the time through the GPS receiver module 118. The positional information acquiring module 218 may acquire the positional information to measure and compute the current position of the system 100. The positional information may be acquired if the earthquake intensity corresponding to the degree of the disaster detected by the detecting module 202 is high enough (e.g., 6 on the Richter scale). The controller module 116 receives the positional information of the wireless communication system 100 from the positional information acquiring module 218 when the degree of the disaster is equal to a predetermined level.

The positional information acquiring module 218 may output the positional information to the data compression module 220. The data compression module 220 compresses the positional information acquired by the positional information acquiring module 218, and outputs the compressed information to the transmitter module 222.

The transmitter module 222 controls the communication module 102 to transmit the positional information to a predetermined external device. Further, the transmitter module 222 is operable to re-execute a transmitting process in response to failing to transmit the positional information. In this manner the transmitter module 222 controls the communication module 102 in such a manner as to carry out the transmitting process of the positional information at a predetermined repetition frequency (for example, five times) until the transmission of the positional information is succeeded.

FIG. 3-6 are exemplary flow charts showing processes 300-600 for detecting intensity of an earthquake according to various embodiments of the disclosure that can be performed by the wireless communication system 100. The various tasks performed in connection with these processes may be performed by software, hardware, firmware, a computer-readable medium having computer executable instructions for performing the process method, or any combination thereof. It should be appreciated that processes 300-600 may include any number of additional or alternative tasks. The tasks shown in FIGS. 3-6 need not be performed in the illustrated order, and these processes may be incorporated into a more comprehensive procedure or process having additional functionality not described in detail herein. For illustrative purposes, the following description of processes 600-700 may refer to elements mentioned above in connection with FIGS. 1-2. In various embodiments, portions of processes 300-600 may be performed by different elements of systems 100-200 e.g., the communication module 102 and the controller module 116. Further, the value of the earthquake intensity of 6 on the Richter scale is used as an exemplary value in the embodiments shown in FIGS. 3-6. However, other earthquake intensity values, measurements and scales may also be used.

Figure 3:
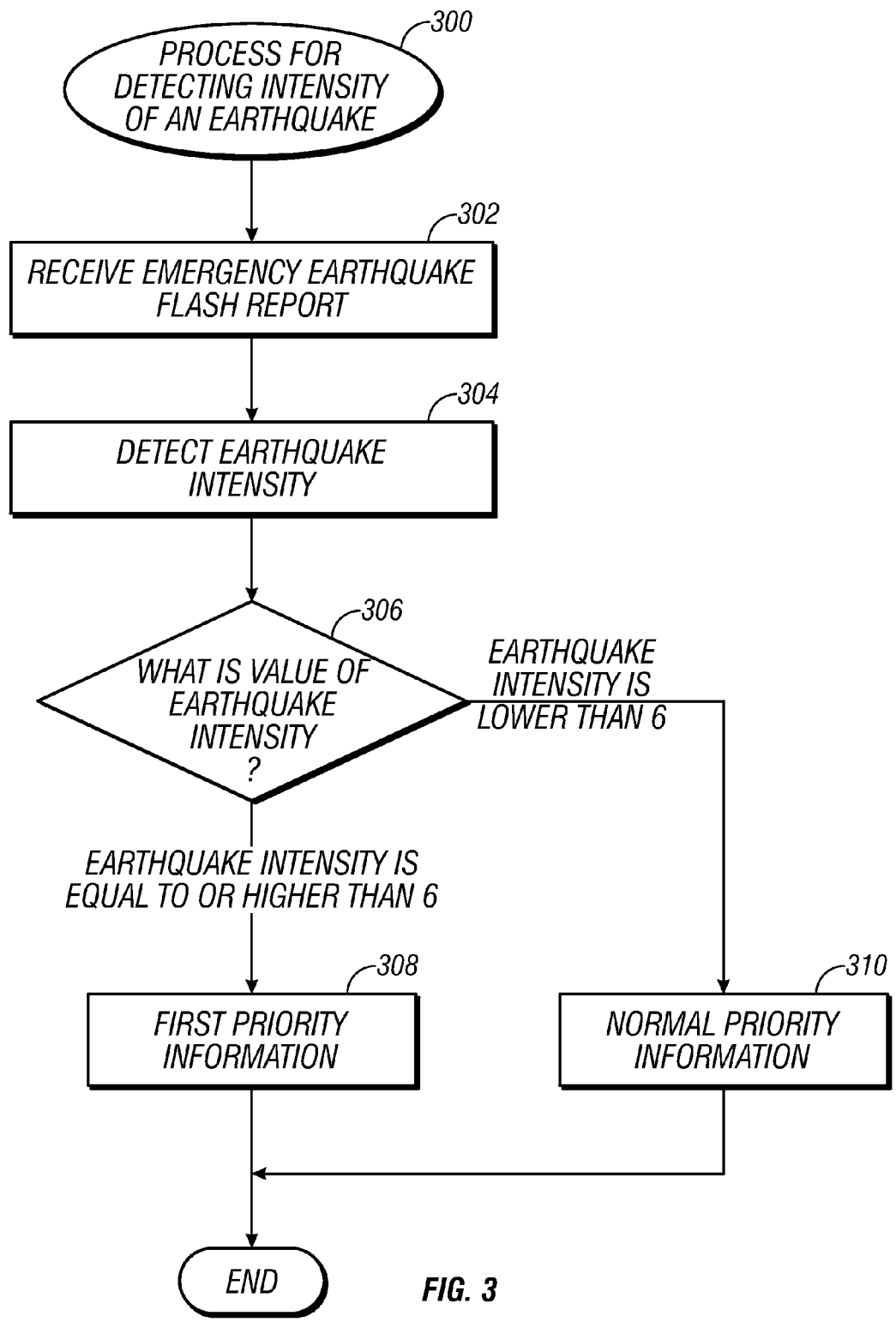
FIG. 3 is a flow chart showing an exemplary process for detecting an intensity of an earthquake according to an embodiment of the disclosure.

FIG. 3 is a flow chart showing an exemplary process 300 for detecting intensity of an earthquake according to an embodiment of the disclosure. As described in more detailed below in context of discussion of process 300, the communication module 102 receives the disaster information (the emergency earthquake flash report). The detector module 202 detects the degree of the disaster, for example, the earthquake intensity from the received disaster information. The controller module 116 may set a control content (i.e., a content set by the controller module 116) such as a video or voice message. The controller module 116 sets the control content to be executed in correspondence to the disaster in accordance with the detected degree of the disaster. For example, flood information for a flood, earthquake information for an earthquake, or fire information for a fire. The deciding module 204 decides the priority order for informing the emergency earthquake flash report in correspondence to the detected degree of the disaster (i.e., most important first). In this manner, it is possible to make a sufficiently good use of the disaster information, and reduce the workload on the user.

Process 300 may begin by receiving the disaster information via the communication module 102, if the earthquake is generated (task 302).

Next, process 300 may detect the degree of the disaster (task 304), for example, the earthquake intensity from the disaster information by the detecting module 202.

Next, process 300 may decide the priority of the disaster information in based on the detected earthquake intensity by the deciding module 204 to inform the user with the most relevant information. In this manner, process 300 determines the earthquake intensity (inquiry task 306). If the earthquake intensity is less than 6, then process 300 detects normal priority information (task 310), otherwise process 300 detects first priority information (task 308). If the process 300 detects the first priority information (task 308) informs the user of the disaster information in a first priority order. In this manner the earthquake information is displayed on screen of the display module 112 to inform the user of possible occurrence of the earthquake. Informing the user of the first priority information has priority over other applications in the system 100. Alternatively, a voice alerts the user that an earthquake may occur. Activation of the voice to alert the user of the first priority information has higher priority over other applications in system 100. If the earthquake intensity is lower than 6 (inquiry task 306), process 300 informs the user of the disaster information (task 310) in accordance with a normal priority order. In this manner, process 300 informs the user of a possible occurrence of the earthquake by a voice message, an alarm sound, or a display screen using the voice processing module 106 or the display module 112 respectively after the other applications are finished processing.

According to the embodiment shown in FIG. 3, as mentioned above, it is possible to make efficient use of the disaster information to reduce the workload on the user. Process 300 determines priority order of the earthquake information (inquiry task 306) based on whether the earthquake intensity is equal to or higher than 6 or is lower than 6, however, other determining factors may also be considered.

Figure 4:
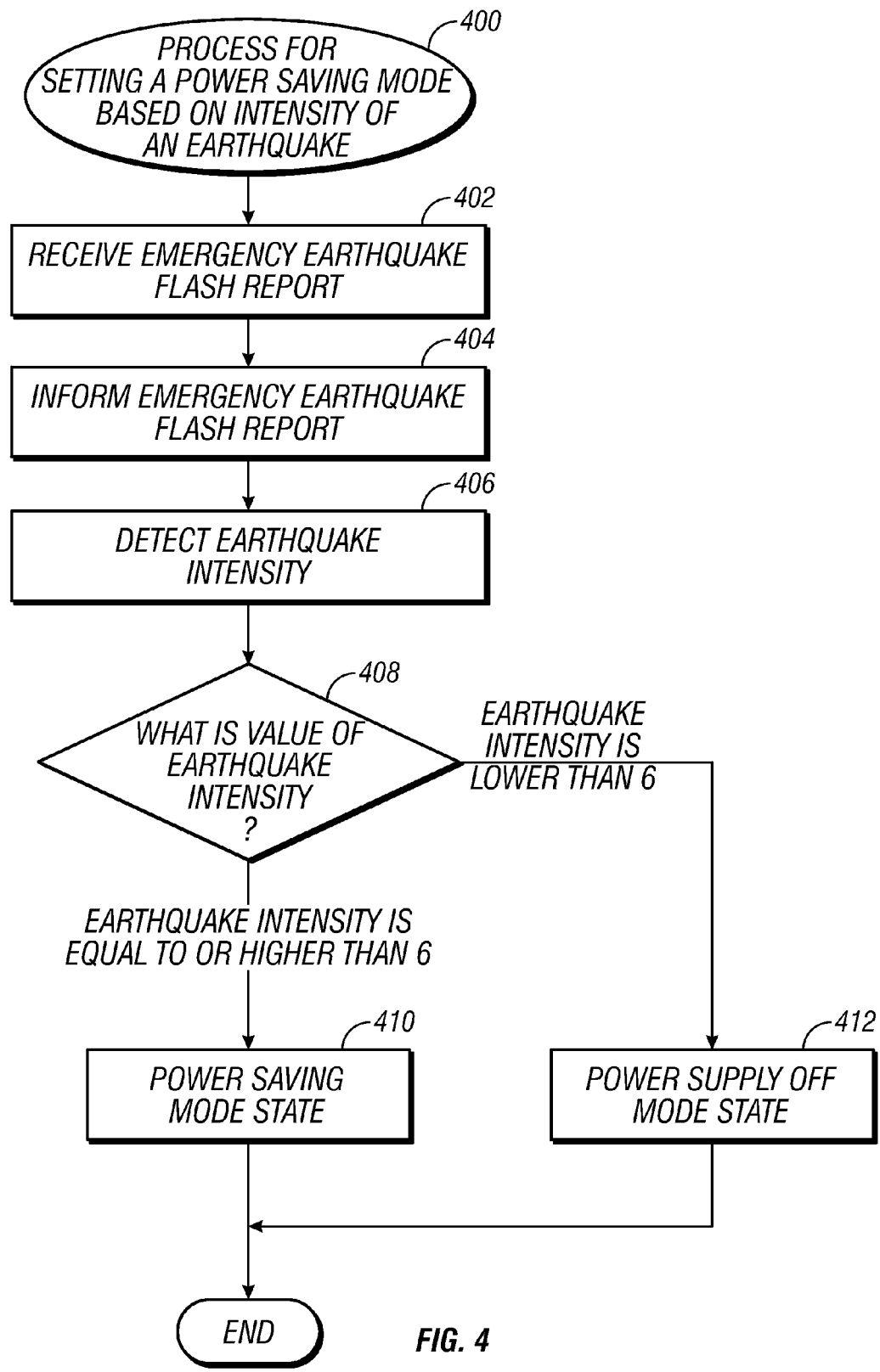
FIG. 4 is a flow chart showing an exemplary process for setting a power saving mode based on the intensity of the earthquake according to an embodiment of the disclosure.

FIG. 4 is an exemplary flow chart showing a process 400 for setting a power saving mode based on an intensity of an earthquake according to an embodiment of the disclosure. As described in more detailed below in context of discussion of process 400 below, communication module 102 receives the disaster information. The detector module 202 detects the degree of the disaster, for example, the earthquake intensity from the degree of the received disaster. The deciding module 204 decides the mode of the system 100 in correspondence to the detected degree of the disaster, and sets the system 100 to the power saving mode or the power supply off mode. In this manner, it is possible to reduce the electric power consumption, and thereby extend the operating time of the wireless communication system 100 at the time of the earthquake disaster. Extending the operating time can be useful during a disaster when electric power may be hard to acquire. Process 400 for detecting intensity of an earthquake may share same definitions and functionalities as explained above in the context of FIGS. 1-3, therefore these definitions and the functionalities are not redundantly explained herein.

Process 400 may begin by receiving the disaster information through the communication module 102, if the disaster such as the earthquake occurs (task 402). Process 400 may then inform the user (task 404), for example, by a voice message, an alarm sound or a display as mentioned above.

Process 400 may then detect the earthquake intensity (task 406) corresponding to the degree of the disaster from the disaster information using the detector module 202.

Process 400 may then determine a value of the earthquake intensity (inquiry task 408), to decide the mode of the system 100 corresponding to the detected earthquake intensity using the deciding module 204 so as to configure the system 100 accordingly. If process 300 determines that the earthquake intensity is equal to or higher than 6, process 400 sets the power saving mode (task 410), and process 400 ends. The power saving mode includes, for example, an intermittent receiving mode of shading a backlight, setting a radio wave off mode to stop the sending and receiving of the radio wave or elongating a receiving interval of the radio wave, and the like. These and other power saving modes may be selected based on the earthquake intensity. If process 300 determines that the earthquake intensity is lower than 6, process 300 sets the mode of the system 100 to power supply off mode (task 412), and process 400 ends.

According to the embodiment shown in FIG. 4, as mentioned above, the electric power consumption is reduced; therefore, the wireless communication system 100 can operate for a long period time. Process 400 determines power setting mode based on whether the earthquake intensity is equal to or higher than 6, or is lower than 6, however, other determining factors may also be considered.

As mentioned above, since the wireless communication system 100 mounts the system informing the positional information of the system 100 thereon, relief operations and communication between family members, rescue workers, etc. can be smoothly carried out wirelessly, if a disaster such as an earthquake or the like occurred.

Figure 5:
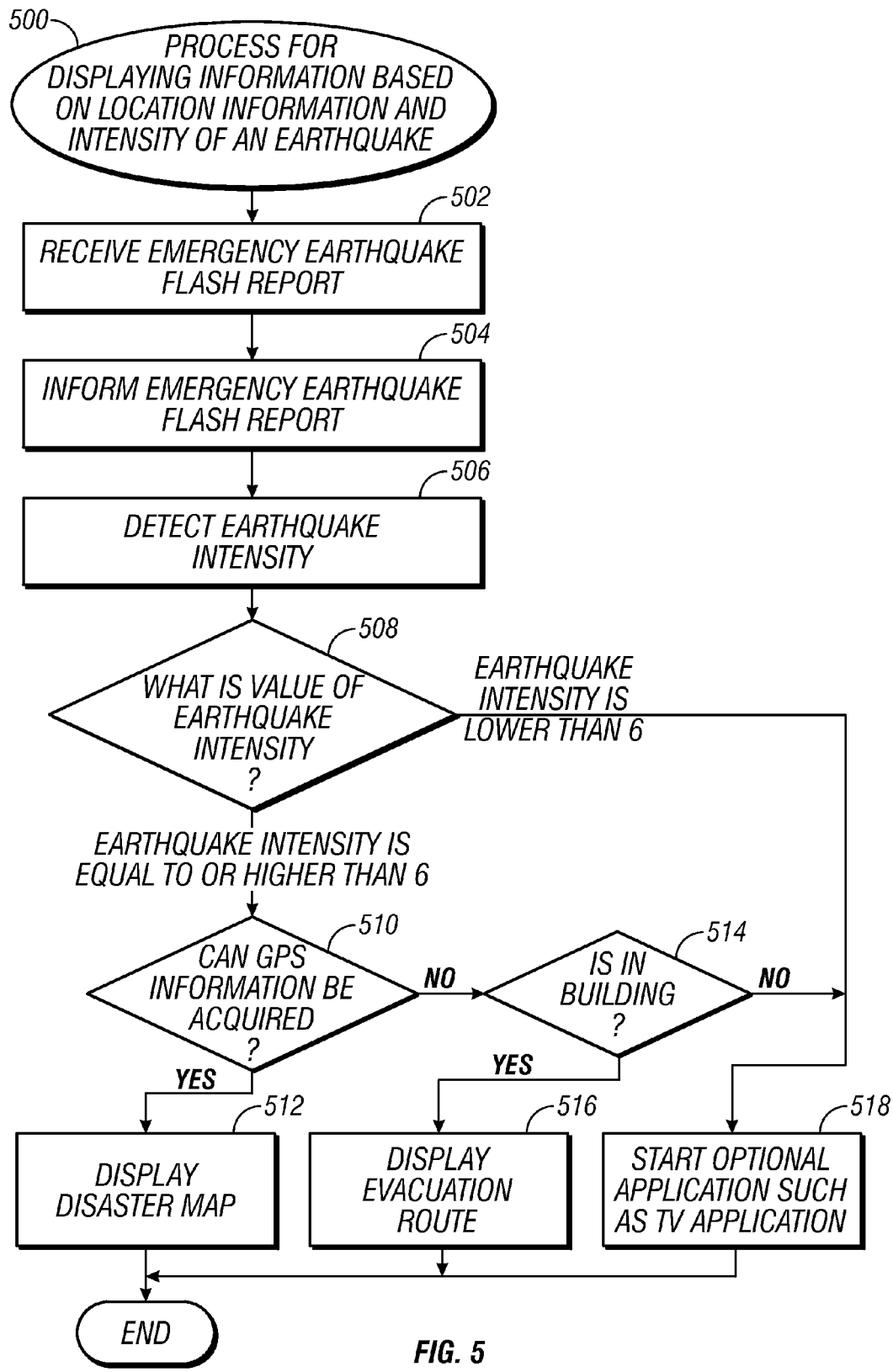
FIG. 5 is a flow chart showing an exemplary process for displaying information based on location information and the intensity of the earthquake according to an embodiment of the disclosure.

FIG. 5 is an exemplary flow chart showing a process 500 for displaying information based on location information and an intensity of an earthquake according to an embodiment of the disclosure. As described in more detailed below in context of discussion of process 500, the communication module 102 receives the disaster information, and the detecting module 202 detects the degree of the disaster, for example, the earthquake intensity from the received emergency earthquake flash report. The system 100 position acquisition determining module 206 determines whether or not the positional information of the system 100 is acquired, in correspondence to the detected degree of the disaster. The display module 112 displays the disaster map if it is determined that the positional information is acquired. The inside building determining module 210 determines whether or not the system 100 (and thus the user) is in the building in which the positional information can be registered, in correspondence to the detected earthquake intensity. The evacuation route displays module 214 causes the display module 112 to display the evacuation route within the building, if it is determined that system 100 is in the building. The start module 216 can start the television software application in correspondence to the detected earthquake intensity, and the display module 112 and the disaster map display control module 208 display the disaster map if it is determined that system 100 is not in the building. The disaster map, the evacuation route, the television software application or the like can be automatically displayed. Accordingly, a sufficient relief operation and a sufficient family communication may be provided wirelessly.

Process 500 for detecting intensity of an earthquake may share same definitions and functionalities as explained above in the context of FIGS. 1-4, therefore these definitions and the functionalities are not redundantly explained herein. For example, tasks 502-506 in process 500 may be similar to tasks 302-306 in process 300 and tasks 402-406 in process 400 and therefore may not be redundantly explained herein.

Process 500 (tasks 504-309) display the disaster map based on the detected earthquake intensity by the disaster map display control module 208, and displays the evacuation route, or starts an optional application such as the television software application or the like by the start module 216. Process 500 determines the value of the earthquake intensity (inquiry task 508). If the earthquake intensity is equal to or higher than 6 (inquiry task 508), process 500 determines whether or not the positional information, for example, the GPS information of the system 100 can be acquired (inquiry task 510). The GPS information in this case may be obtained from an artificial satellite or a base station. If the GPS information is acquired, the process 500 displays the disaster map on the display module 112 (task 512). If, the GPS information cannot be acquired (inquiry task 510), process 300 determines whether or not the user is in a building in which the positional information is registered, by the inside building determining module 210 (i.e., the inside building determining module 210 determines if system 100 and/or a user is inside a building).

If the user is in the building (task 514), process 500 displays an evacuation route on the display module 112 (task 516). Otherwise process 500 selects a predetermined channel by the start module 216 to start an optional application (task 518) such as the television software application or the like as mentioned above. Accordingly, the control module 216 displays the predetermined television information on the display module 112.

According to the embodiment shown in FIG. 5, the disaster map, the evacuation route, the television software application or the like, can be automatically displayed on the display module 112, thereby providing a sufficient relief operation and a family communication wirelessly.

Figure 6:
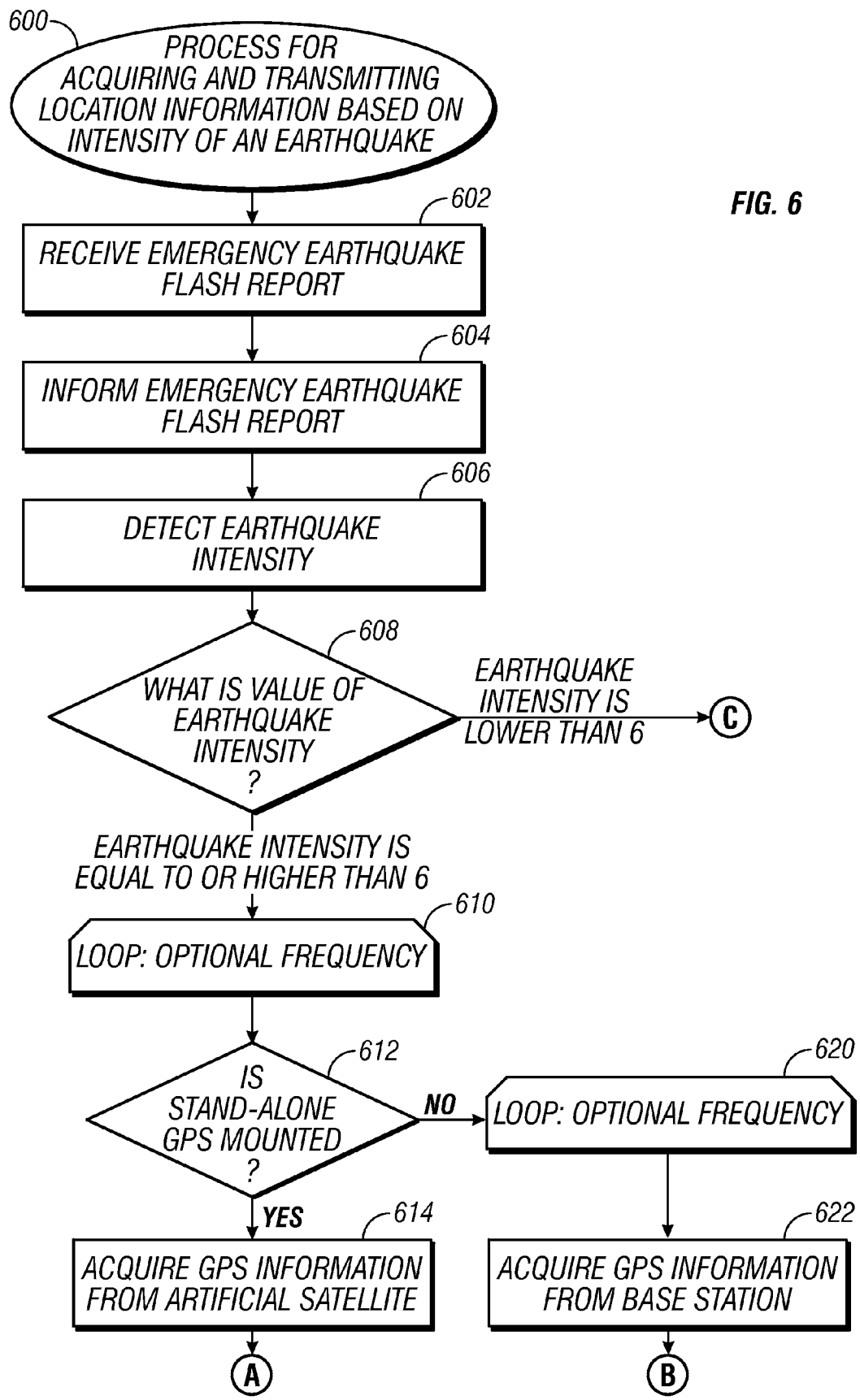
FIG. 6 is a flow chart showing an exemplary process for acquiring and transmitting location information based on the intensity of the earthquake according to an embodiment of the disclosure.
Figures 2, 6:
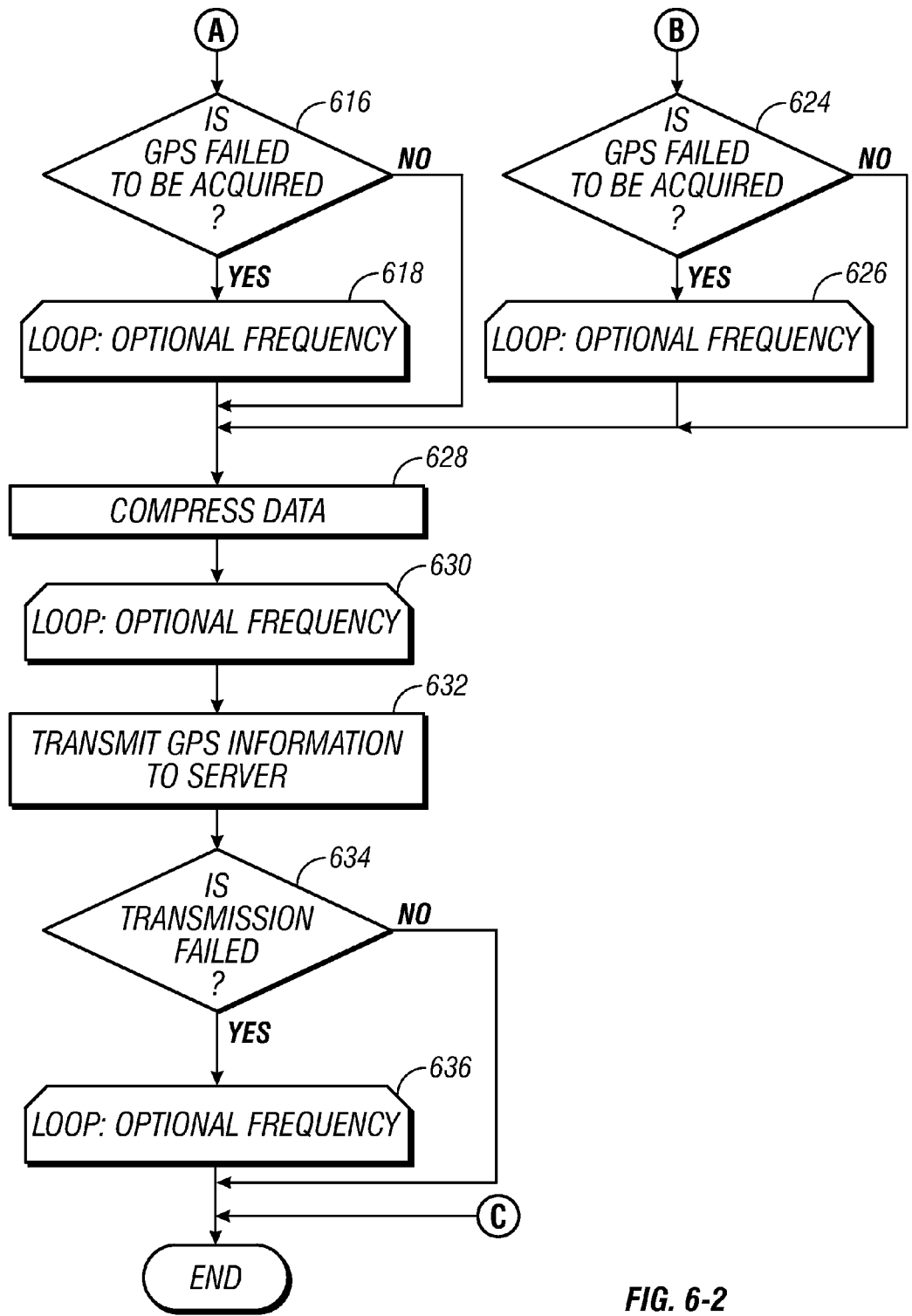

FIG. 6 is a flow chart showing an exemplary process 600 for acquiring and transmitting location information based on an intensity of an earthquake according to an embodiment of the disclosure. As described in more detailed below in context of discussion of process 600, the positional information acquiring module 218 acquires the positional information of the system 100 corresponding to the earthquake intensity detected by the detector module 202. The data compression module 220 compresses the acquired positional information, and the transmitters of the communication module 102 and the transmitter 222 transmit compressed positional information to the predetermined external device. In this manner the positional information of the system 100 is automatically transmitted to the external server. Further, data compression can be used to reduce communication time.

Process 600 for detecting intensity of an earthquake may share same definitions and functionalities as explained above in the context of FIGS. 1-5, therefore these definitions and the functionalities are not redundantly explained herein. For example, tasks 602-606 in process 600 may be similar to tasks 403-406 in process 400 and tasks 502-506 in process 500 and therefore may not be redundantly explained herein.

Process 600 (tasks 608-636) transmits the positional information of the system 100 in correspondence to the detected earthquake intensity. If the earth quake intensity is, for example, lower than 6 process 600 ends. If the earthquake intensity is, for example, greater than or equal 6, process 600 transmits the GPS positional information to an external server via the communication module 102 using the transmitter module 222. If the earthquake intensity is equal to or higher than 6, the positional information of the system 100 is transmitted to the external server as explained below.

Tasks 612-626 acquire the system 100 positional information, i.e., the GPS information. Tasks 614-618 correspond to the case that a stand-alone GPS is mounted, and the tasks 622-626 correspond to the case that the stand-alone GPS is not mounted.

Process 600 determines whether a stand-alone GPS is mounted (inquiry task 612). If a stand-alone GPS is mounted (inquiry task 612), process 600 continues to acquire the GPS information from the artificial satellite (task 614) by using the GPS receiver 118. The GPS information acquisition is carried out at a predetermined repetition frequency by the steps 616 and 618 until the acquisition is successful. In this manner, the controller module 116, re-executes an acquiring process in response to failing to acquire the positional information.

If a stand-alone GPS is not mounted, process 600 may acquire the GPS information from a near base station (task 622). The GPS information acquisition can then be carried out at a predetermined repetition frequency (task 624 and 626) until it is successfully acquired.

After acquiring the GPS information, process 600 may then compress the GPS information using the data compression module 220 (task 628). Process 600 may then transmit the compressed GPS information by the transmitter module 222 to the external server (task 632) via the communication module 102. The transmission is carried out by the task 634 and 636 at a predetermined repetition frequency until the GPS information is successfully transmitted.

According to the embodiment shown in FIG. 6, the positional information of the system 100 is automatically transmitted to the external server. Further, it is possible to minimize or avoid a communication disturbance by use of data compression to reduce communication.

While at least one exemplary embodiment has been presented in the foregoing detailed description, the present disclosure is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying drawings, it is to be noted that changes and modifications may be apparent to those skilled in the art. Such changes and modifications are to be understood as being included within the scope of the present disclosure as defined by the claims.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A wireless communication device comprising:
   a receiver module operable to receive disaster information concerning a disaster that is external to the wireless communication device;
   a detector module operable to detect a degree of severity of a disaster from the disaster information; and
   a controller module operable to set a control content corresponding to the degree of severity of the disaster, wherein the controller module is further operable to set the wireless communication system in a power saving mode if the degree of severity of the disaster is higher than a predetermined degree, and set the wireless communication system in a power supply off mode if the degree of severity of the disaster is lower than the predetermined degree.

2. The wireless communication device according to claim 1, wherein the controller module is further operable to determine a priority order for informing a user of the disaster information based on the degree of the disaster.

3. The wireless communication device according to claim 1, wherein the controller module is further operable to acquire positional information of the wireless communication system when the degree of the disaster is equal to or greater than a predetermined level.

4. The wireless communication device according to claim 3, wherein the controller module is further operable to control a display to display the positional information on a disaster map.

5. The wireless communication device according to claim 1, wherein the controller module is further operable to determine whether the wireless communication system is in a predetermined building when the degree of the disaster is equal to or greater than a predetermined level.

6. The wireless communication device according to claim 5, wherein the controller module is further operable to control a display to display an evacuation route of the building, if the wireless communication device is located in the predetermined building.

7. The wireless communication device according to claim 5, wherein the controller module is further operable to control a display to display a disaster map, if the wireless communication device is not located in the predetermined building.

8. The wireless communication device according to claim 3, further comprising a transmitter module operable to transmit the positional information to an external device.

9. The wireless communication device according to claim 8, further comprising a data compression module operable to compress the positional information to obtain compressed positional information, wherein the transmitter module is further operable to transmit the compressed positional information to an external device.

10. The wireless communication device according to claim 8, wherein the controller module is further operable to re-execute an acquiring process in response to failing to acquire the positional information.

11. The wireless communication device according to claim 8, wherein the transmitter module is further operable to re-execute a transmitting process in response to failing to transmit the positional information.

12. The wireless communication device according to claim 1, wherein the controller module is further operable to start a television software application when the degree of severity of the disaster is equal to or greater than a predetermined level.

13. The wireless communication device according to claim 12, wherein the television software application comprises a plurality of channels and the controller module is further operable to select a predetermined channel when starting the television software application.

14. A method of controlling a wireless communication apparatus comprising:
   receiving disaster information concerning a disaster external to the wireless communication apparatus;
   detecting a degree of severity of a disaster based on the disaster information; and
   setting a control content corresponding to the degree of severity of the disaster, wherein the wireless communication apparatus is set to a power saving mode if the degree of severity of the disaster is higher than a predetermined degree, and the wireless communication apparatus is set to a power supply off mode if the degree of severity of the disaster is lower than the predetermined degree.

15. The method of controlling a wireless communication apparatus of claim 14, wherein the control content comprises at least one of the group consisting of: a video, a voice message, and a text message.

16. A non-transient computer-readable medium storing instructions that when executed by a processor, perform a method of controlling a wireless communication apparatus, the method comprising:
   receiving disaster information concerning a disaster external to the wireless communication apparatus;
   detecting a degree of severity of a disaster based on the disaster information; and
   setting a control content corresponding to the degree of severity of the disaster, wherein the wireless communication apparatus is set to a power saving mode if the degree of severity of the disaster is higher than a predetermined degree, and the wireless communication apparatus is set to a power supply off mode if the degree of severity of the disaster is lower than the predetermined degree.

17. The computer-readable medium of claim 16, wherein the control content comprises at least one of the group consisting of: a video, a voice message, and a text message.

* * * * *